United States Patent [19]

Uchiyama

[11] Patent Number: 5,708,242
[45] Date of Patent: Jan. 13, 1998

[54] AUTOMOTIVE LEVER SWITCH ASSEMBLY

[75] Inventor: Norio Uchiyama, Tokyo, Japan

[73] Assignee: Niles Parts Co., Ltd., Japan

[21] Appl. No.: 640,130

[22] Filed: Apr. 30, 1996

[30]   Foreign Application Priority Data

Jul. 5, 1995   [JP]   Japan .................. 7-192425

[51] Int. Cl.$^6$ ............................................. H01H 9/00
[52] U.S. Cl. ................................... 200/61.54; 200/4
[58] Field of Search ..................... 200/4, 61.27, 61.54

[56]   References Cited

U.S. PATENT DOCUMENTS

| | | | |
|---|---|---|---|
| 5,047,600 | 9/1991 | Enari et al. | 200/61.54 |
| 5,272,290 | 12/1993 | Suzuki et al. | 200/61.54 |
| 5,313,029 | 5/1994 | Kerner et al. | 200/61.54 |
| 5,440,085 | 8/1995 | Suzuki et al. | 200/61.54 |
| 5,473,809 | 12/1995 | DuRocher et al. | 200/61.54 |
| 5,491,312 | 2/1996 | Newman et al. | 200/61.54 |

FOREIGN PATENT DOCUMENTS 63-23254   9/1981   Japan .

*Primary Examiner*—Stuart N. Hecker
*Attorney, Agent, or Firm*—Ronald P. Kananen

[57]   ABSTRACT

A lever switch assembly for controllably operating an automotive wiper or the like includes a leaf spring having an attachment portion whereby the leaf spring is secured to a switch board in a single fabrication process. A lever 1 is capable of vertical pivotal movement. A leaf spring 10 is operated and contacted with a fixed contact plate 14 as the lever 1 is vertically pivoted. The fixed contact plate 14 is mounted on a switch board 9. The leaf spring 10 has at its one end movable contacts 10b and 10c adapted to contact with the fixed contact plate 14, and at its other end an attachment portion 10d adapted to secure the leaf spring 10 to the switch board 9.

6 Claims, 4 Drawing Sheets

AUTOMOTIVE LEVER SWITCH ASSEMBLY

BACKGROUND OF THE INVENTION

1. Field of the Invention

The present invention relates generally to switches for automobiles and, in particular, to an automotive lever switch assembly constructed to controllably operate an automotive wiper or the like.

2. Description of the Related Art

A conventional automotive lever switch assembly is disclosed, for example, in Japanese Utility Model Publication No. Sho 63-23254. Such an automotive lever switch includes an operating lever. When the operating lever is operable to provide mist, a push rod is caused to urge a leaf spring into contact with a fixed contact so as to turn on a mist switch. One end of the leaf spring is riveted or otherwise crimped.

However, such securement of the leaf spring not only makes assembly of the automotive lever switch assembly cumbersome, but also brings about an increase in the number of required parts and thus, an increase in the production cost.

SUMMARY OF THE INVENTION

An object of the present invention is to solve the problems associated with the aforementioned conventional switch assembly.

In order to solve the above-mentioned problems, the present invention has an object to attach a leaf spring to a switch board in a single fabrication step and reduce the number of required parts of the switch assembly.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To overcome the problems associated with the prior art, the present invention provides an automotive lever switch assembly comprising a vertically pivotable lever, a switch board on which a fixed contact plate is mounted, and a leaf spring adapted to be moved into contact with the fixed contact plate as the lever is vertically pivoted, wherein the leaf spring has at its one end movable contacts adapted to be contacted with the fixed contact plate, and at its other end an attachment portion through which the leaf spring is secured to the switch board.

The attachment portion of the leaf spring has an L shape, and the switch board includes a through hole shaped to receive the L-shaped attachment portion.

Also, the attachment portion of the leaf spring includes an aperture or a pawl, and the switch board includes a pawl or a bore within the through hole. The switch board is engaged with the leaf spring.

The through hole is defined by the inner wall of the switch board, and a projection extends from the inner wall and is placed in contact with the leaf spring.

The leaf spring has at least three tongues at its one end. The tongues include a central tongue that has an operating portion placed in contact with the lever. The other two tongues are provided with the movable contacts.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENT

A preferred embodiment of the present invention will be described in detail hereinafter with reference to FIGS. 1 to 4 of the accompanying drawings.

Figure 1:
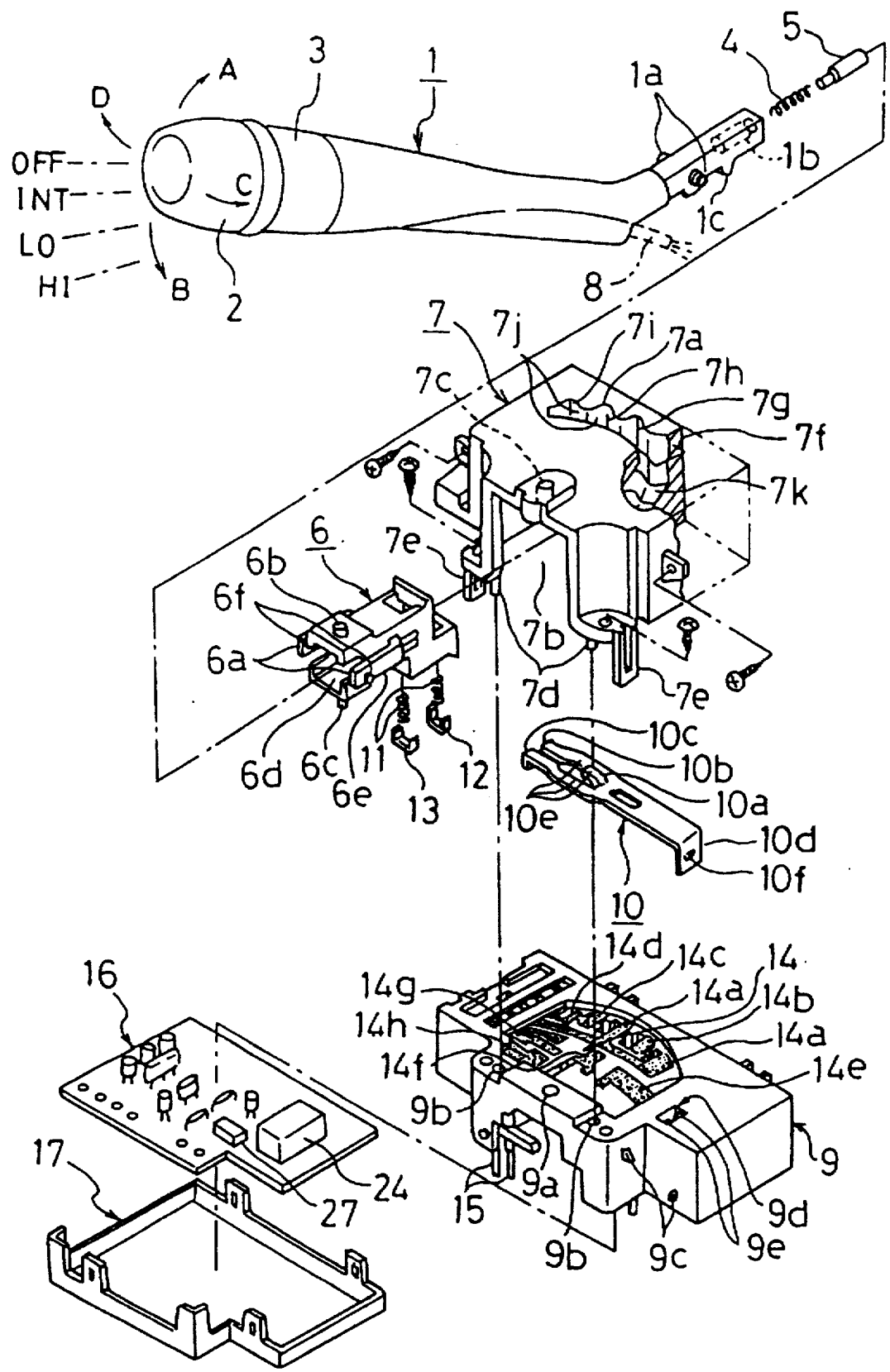
FIG. 1 is an exploded perspective view of an automotive lever switch assembly according to a preferred embodiment of the present invention.

A lever 1 used, for example, as a wiper switch is mounted to a base which, in turn, is fixed to an automotive steering column (not shown). As shown in FIG. 1, the lever 1 has a blind hole 1b at its one end. A click element 5 is inserted into the blind hole 1b through a click spring 4, which is also positioned within the blind hole 1b (as described below). An intermittent wiper volume control 2 and a rear wiper washer switch 3 are rotary switches mounted to the other end of the lever 1. The descriptive phrases "one end" and "other end" of the lever 1 are used throughout this application for convenience and may be reversed.

Figure 2:
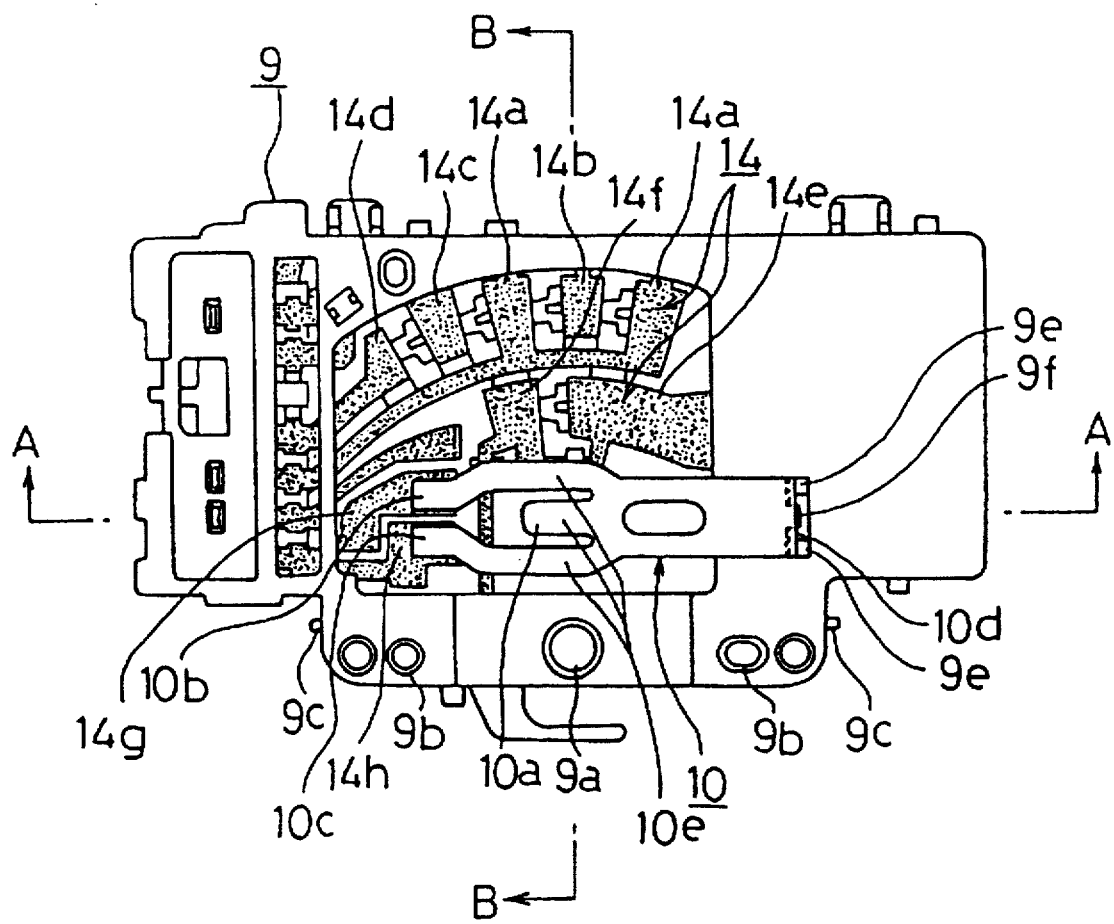
FIG. 2 is an enlarged plan view of a switch board according to the preferred embodiment of the present invention.

As shown in FIGS. 1 and 2, the lever 1 is vertically pivoted about pivot pins 1a in directions indicated by the arrows A and B. A wiper washer is operated when the lever 1 is pivoted upwards or in the direction of the arrow A. A cord 8 extends through the lever 1 and is connected to the wiper volume 2 and the rear washer switch 3. The lever 1 has one end inserted into a movable body 6. The movable body 6 has bearings 6a at its opposite sides. The pivot pins 1a of the lever 1 are journaled by the bearings 6a.

Also, the lever 1 is pivoted about a pair of pivot pins 6b and 6c of the movable body 6 in a to-and-fro direction or directions indicated by the arrows C and D. A wiper is stopped when the lever 1 is moved to a wiper stop position (OFF) or fully rotated in the direction of the arrow D. When the lever 1 is incrementally rotated in a stepwise manner in the direction of the arrow C, the lever 1 is moved first to an intermittent wiper position (INT), second to a low speed wiper position (LO), and third to a high speed wiper position (HI).

The spring 4 is inserted into the blind hole 1b to resiliently bias the click element 5 in a direction away from the blind hole 1b. The spring 4 is, for example, in the form of a coil spring. The click element 5 is, for example, in the form of a pin with a semispherical end or steel ball. The click element 5 is pressed against a click face 7a.

A case 7 has an opening 7b to receive the movable body 6. The movable body 6 has an upper pivot pin 6b and a lower pivot pin 6c. The movable body 6 together with the lever 1 is rotated about the pivot pins 6b and 6c in directions indicated by the arrows C and D. A pin hole 7c is formed in the wall of the opening 7b to receive the pivot pin 6b of the movable body 6. A pin hole 9a is also formed in a switch board 9 to receive the pivot pin 6c. Below the click face 7a, a pair of movable contact elements 12 and 13 are attached to the movable body 6 through a pair of corresponding springs 11.

As shown in FIG. 1, the bearings 6a are in the form of resilient tongues with opposite pin holes 6f. A horizontal bore 6d is adapted to receive one end of the lever 1 and extends along the side of the movable body 6. A vertical bore 63 is formed in the lower surface of the movable body 6 to insure that a bias element 1c of the lever 1 is pressed into contact with an operating portion 10a of a leaf spring 10. The pin holes 6f are formed in the opposite sides of the movable body 6 to receive the pivot pins 1a of the lever 1.

The case 7 is attached to a switch base (not shown), which is in turn screwed to the steering column. The case 7 includes a pair of positioning pins 7d that are inserted into a corresponding pair of blind holes 9b. The case 7 is screwed to the switch board 9.

The click face 7a includes a plurality of click grooves 7f, 7g, 7h and 7i defined to hold the lever 1 in the wiper stop position (OFF), the intermittent wiper position (INT), the low speed wiper position (LO), and the high speed wiper position (HI), respectively. A plurality of vertical surfaces 7j and oblique surfaces 7k are formed in the respective click grooves 7f, 7g, 7h and 7i. The click face 7a is defined in the rear wall of the opening 7b.

As shown in FIG. 1, the click grooves 7f, 7g, 7h and 7i extend in a vertical direction and have continuous arcuate sections. The click groove 7f holds the lever 1 in the wiper stop position (OFF). The click groove 7g holds the lever 1 in the intermittent wiper position (INT). The click groove 7h holds the lever 1 in the low speed wiper position (LO). The click groove 7i holds the lever 1 in the high speed wiper position (HI).

The vertical surfaces 7j hold the wipe washer in an off position. When the lever 1 is fully rotated in the direction of the arrow B, the click element 5 is pressed into contact with the vertical surfaces 7j. The vertical surfaces 7j vertically extend above the click grooves 7f, 7g, 7h and 7i in the rear wall of the opening 7b. The lever 1 is rotated in the direction of the arrow A with a click when the click element 5 is pressed into contact with the oblique surfaces 7k. The oblique surfaces 7k allow the lever 1 to be automatically returned to a neutral position (N) when the lever 1 is released from a user's hand. The wiper washer is rendered operative when the click element 5 is pressed against the oblique surfaces 7k. The oblique surfaces 7k extend continuously and downwardly from the vertical surfaces 7j of the respective click grooves 7f, 7g, 7h and 7i.

Figure 3:
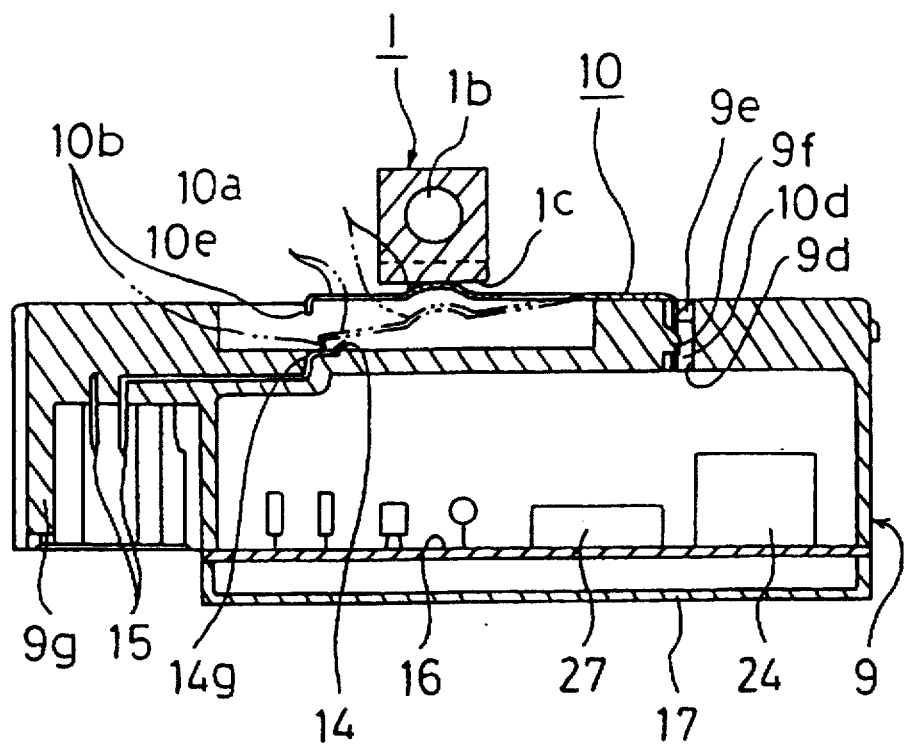
FIG. 3 is a sectional view of the preferred embodiment of the present invention taken along line A—A of FIG. 2.
Figure 4:
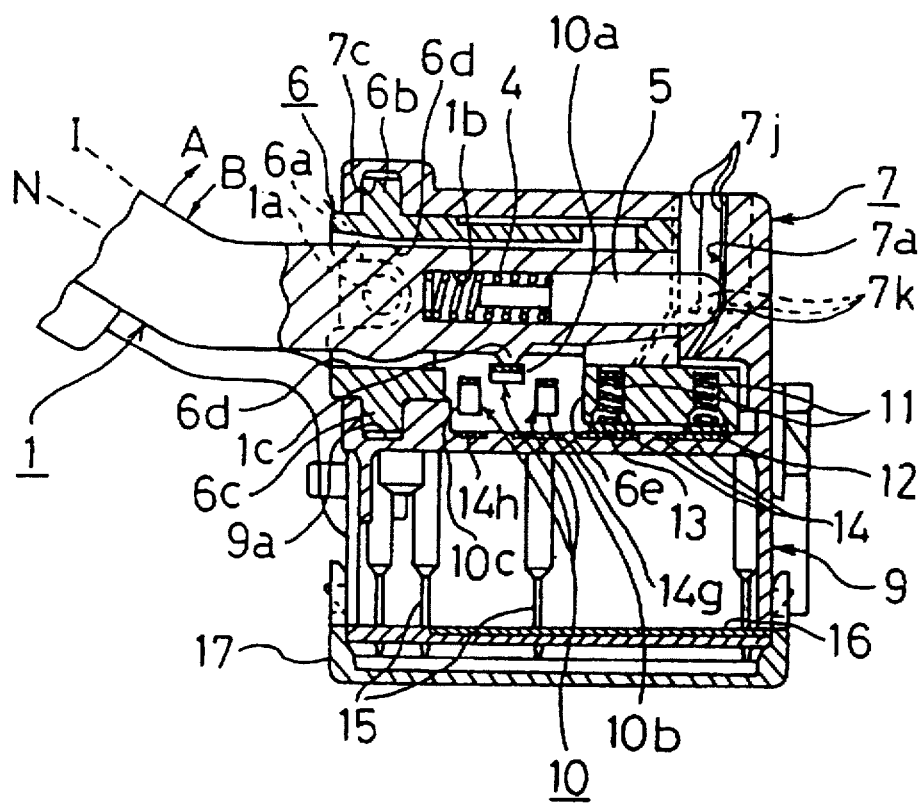
FIG. 4 is a sectional view of the preferred embodiment of the present invention taken along line B—B of FIG. 2.

The switch board 9 is integrally formed with a fixed contact plate 14 and terminals 15 by an insert molding. A cover 17 is attached to the switch board 9 through a base plate 16. A through hole 9d extends through the switch board 9 and has a rectangular section. As shown in FIGS. 1 to 3, a pair of opposite projections 9e extend from the upper end of the through hole 9d and are pressed against an attachment portion 10d of the leaf spring 10. As shown in FIGS. 2 and 3, a pawl 9f is formed within the through hole 9d and adapted to engage with an aperture 10f of the leaf spring 10. Illustratively, the pawl 9f extends centrally from one inner wall of the through hole 9d adjacent to the fixed contact plate 14. Also, the projection 9e extends from another inner wall of the through hole opposite to the pawl 9f. The projection 9e and the pawl 9f may be formed at other locations provided that they are defined within the through hole 9d.

As shown in FIGS. 1 and 2, the leaf spring 10 includes three separate tongues 10e that extend from substantially the center toward its one end. The attachment portion 10d is formed in the other end of the leaf spring 10 and has a L-shape. The attachment portion 10d is press fit into the through hole 9d to secure the leaf spring 10 to the switch board 9 in a single fabrication process.

The tongues 10e typically include a central operating portion 10a and opposite movable contacts 10b and 10c. The number of movable contacts is not limited to a particular number. There may be provided three or more movable contacts. In such a case, the operating portion 10a should extend along substantially the center line of the leaf spring 10. The attachment portion 10d is formed with the aperture 10f adapted to receive the pawl 9f.

The leaf spring 10 may have a pawl in lieu of the aperture 10f. The through hole 9d of the switch board 9 may have a projection adapted to engage with that pawl.

The operating portion 10a is in the form of a bent tongue 10e located between the movable contacts 10b and 10c and placed in contact with the bias element 1c. The operating portion 10a may be actuated by a push rod disposed between the lever 1 and the operating portion 10a. The movable contacts 10b and 10c have a L-shape and are formed by downwardly bending the ends of the tongues 10e at opposite sides of the operating portion 10a. When the lever 1 is rotated in the direction of the arrow A, the operating portion 10a is pressed by the bias element 1c. As a result, the movable contacts 10b and 10c are bent into contact with the fixed contacts 14g and 14h.

The operating portion 10a, the movable contact 10b and the movable contact 10c of the leaf spring 10 may be formed in one piece. For example, the operating portion 10a may have a single movable contact with no operating portion. Also, the leaf spring may serve as a contact for a passing light switch rather than the wiper washer switch. The leaf spring 10 is not limited to a particular application. The lead spring 10 may be contacted with the fixed contact plate 14 near the attachment portion 10d, and the movable contacts 10b and 10c may serve as a mist operating contact and a wiper washer operating contact, respectively.

The movable contact element 12 is selectively contacted with the fixed contacts 14a, 14b, 14c and 14d when the lever 1 is rotated in directions indicated by the arrows C and D. The movable contact element 13 is selectively contacted with the fixed contacts 14e and 14f when the lever 1 is rotated in directions indicated by the arrows C and D.

The fixed contact plate 14 has an upper end located on the switch board 9 and a lower end integral with or welded to the terminals 15. The fixed contact plate 14 is composed of fixed contacts 14a to 14h. The fixed contact 14a is contacted with the movable contact element 12 when the lever 1 is moved to the wiper stop position (OFF), the intermittent wiper position (INT), and the low speed wiper position (LO). The fixed contact 14a serves as a contact for operating the wiper at low speeds. The fixed contact 14b is contacted with the movable contact element 12 when the lever is moved to the wiper stop position (OFF) and the intermittent wiper position (INT). The fixed contact 14b serves as a ground contact.

The fixed contact 14c is contacted with the movable contact element 12 when the lever 1 is moved to the low speed wiper position (LO) and the high speed wiper position (HI). The fixed contact 14d is contacted with the movable contact element 12 when the lever 1 is moved to the high speed wiper position (HI). The fixed contact 14d serves as a contact for operating the wiper at high speeds. The fixed contact 14e is contacted with the movable contact element 13 when the lever 1 is moved to the intermittent wiper position (INT). The fixed contact 14f is contacted with the movable contact element 13 when the lever 1 is moved to the intermittent wiper position (INT). The fixed contact 14f serves as a contact for intermittently operating the wiper.

The fixed contact 14g is contacted with the movable contact 10b when the lever 1 is rotated in the direction of the arrow A. The fixed contact 14g is connected to a power source. The fixed contact 14h is contacted with the movable contact 10c when the lever 1 is rotated in the direction of the arrow A. The fixed contact 14h is connected to a wiper washer operating circuit. The terminals 15 are welded within the through hole of the base plate 16. Other terminals (not shown) are located within a connector 9g of the switch board shown in FIG. 3. A relay 24, integrated circuits 27 and other electric parts are mounted to the base plate 16. The base plate 16 is disposed between the switch board 9 and the cover 17. The cover 17 is secured to the switch board 9.

The operation of the automotive lever switch assembly thus constructed will next be described with reference to the accompanying drawings.

To secure the leaf spring 10 to the switch board 9, the attachment portion 10d is inserted into the through hole 9d. This insertion locks the tongues 10e against horizontal movement. Also, the projection 9e is contacted with the attachment portion 10d. This contact locks the tongues 10e against vertical movement. With the aperture 10f engaged with the pawl 9f, the leaf spring 10 cannot be disengaged from the switch board 9.

FIGS. 2 and 3 show the lever 1 in its neutral position (N). In this position, the click element 5 is pressed against the vertical surfaces 7j of the click face 7a. The leaf spring 10 is not bent by the bias element 1c, and the movable contacts 10b and 10c are separated from the fixed contacts 14g and 14h. The movable contact element 12 is contacted with the fixed contacts 14a and 14b.

When the lever 1 is pivoted about the pivot pins 1a in the direction of the arrow A until the lever 1 is moved from the neutral position (N) to a wipe washer operating position (I), the click element 5 is moved from the vertical surface 7j to the vertical surface 7k. The operating portion 10a of the leaf spring 10 is then pressed by the bias element 1c. As a result, the movable contacts 10b and 10c are brought into contact with the fixed contacts 14g and 14h, respectively, to actuate the wiper washer.

The leaf spring 10 is composed of the three tongues 10e with the central tongue 10e formed at the center of the operating portion 10a, and the movable contacts 10b and 10c formed at opposite sides of the operating portion 10a. With this arrangement, when the operating portion 10a is pressed by the bias element 1c, the movable contacts 10b and 10c are bent in a uniform fashion. This produces even pressure for better switching operation.

If the lever 1 in its wiper washer operating position (I) is released from a user's hand, the spring 4 causes the click element 5 to be moved from the oblique surface 7k to the vertical surface 7j. The lever 1 is then rotated in the direction of the arrow B and automatically returned to its neutral position (N).

When the lever 1 is rotated in the direction of the arrow D, the click element 5 is received within the click groove 7f. At this time, the lever 1 is in its wiper stop position (OFF). If the lever 1 is incrementally rotated in the direction of the arrow C by one step, the click element 5 is moved into engagement with the click groove 7g. The movable contact elements 12 and 13 are also brought into contact with the fixed contacts 14a and 14b and the fixed contacts 14e and 14f, respectively. This causes the lever 1 to be moved from the wiper stop position (OFF) to the intermittent wiper position (INT) wherein the wiper is intermittently operated. The interval of intermittent wiping operation can be adjusted by rotating the intermittent wiper volume when the lever 1 is in the intermittent wiper position (INT).

When the lever 1 is incrementally rotated in the direction of the arrow C by another step, the click element 5 is moved into engagement with the click groove 7h, and the movable contact element 12 is brought into contact with the fixed contacts 14a and 14c. The lever 1 is moved from the intermittent wiper position (INT) and set at the low speed wiper position (LO) wherein the wiper is operated at a low speed.

When the lever 1 is incrementally rotated in the direction of the arrow C further by one step, the click element 5 is moved into engagement with the click groove 7i, and the movable contact element 12 is brought into contact with the fixed contact 14d. The lever 1 is moved from the low speed wiper position (LO) and set at the high speed wiper position (HI) wherein the wiper is operated at a high speed.

The present invention as thus far described offers the following advantages.

(1) The present invention provides an automotive lever switch assembly that comprises a vertically pivotable lever, a switch board on which a fixed contact plate is mounted, and a leaf spring adapted to be moved into contact with the fixed contact plate as the lever is vertically pivoted, wherein the leaf spring has, at its one end, movable contacts adapted to be contacted with the fixed contact plate and at its other end, an attachment portion through which the leaf spring is secured to the switch board. This arrangement allows for mounting of the leaf spring to the switch board in a single fabrication process, and thus reduces the number of fabrication steps and required parts.

(2) The attachment portion of the leaf spring has a L-shape, and the switch board includes a through hole shaped to receive the L-shaped attachment portion. This arrangement facilitates mounting of the leaf spring to the switch board and enables automatic mounting of the leaf spring.

(3) The attachment portion of the leaf spring includes an aperture or a pawl, and the switch board includes a pawl or a bore within the through hole. The switch board is engaged with the leaf spring. This arrangement prevents the leaf spring from being disengaged from the switch board.

(4) The through hole of the switch board has an inner wall, and a projection extending from the inner wall and placed in contact with the leaf spring. This arrangement prevents loosening of the leaf spring.

(5) The leaf spring has at least three tongues at its one end. The tongues include a central tongue having an operating portion placed in contact with the lever, and the other two tongues including the movable contacts. This arrangement allows for uniform bending of the tongues when the operating portion is pressed by the lever and thus, produces uniform contact pressure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

I claim:

1. An automotive lever switch assembly, comprising:
   a vertically pivotable lever (1);
   a switch board (9) on which a fixed contact plate (14) is mounted; and
   a leaf spring (10) adapted to be moved into contact with the fixed contact plate (14) as said lever is vertically pivoted;

said leaf spring (10) having, at a first end, movable contacts (10b, 10c) adapted to be contacted with said fixed contact plate (14) and, at a second end, an attachment portion (10d) through which said leaf spring (10) is secured to said switch board (9);

wherein said attachment portion (10d) of said leaf spring (10) has a L-shape, and said switch board (9) includes a through hole (9d) shaped to receive said L-shaped attachment portion (10d).

2. An automotive lever switch assembly as defined in claim 1, wherein said through hole (9d) of said switch board (9) has an inner wall, and a projection (9e) extending from said inner wall and placed in contact with said leaf spring (10).

3. An automotive lever switch assembly as defined in claim 1, wherein said attachment portion of said leaf spring includes a pawl, and said switch board includes a bore within said through hole, said switch board being engaged with said leaf spring.

4. An automotive lever switch assembly as defined in claim 1, wherein said attachment portion (10d) of said leaf spring (10) includes an aperture (10f), and said switch board (9) includes a pawl (9f) within said through hole (9d), said switch board (9) being engaged with said leaf spring (10).

5. An automotive lever switch assembly as defined in claim 4, wherein said through hole (9d) of said switch board (9) has an inner wall, and a projection (9e) extending from said inner wall and placed in contact with said leaf spring (10).

6. An automotive lever switch assembly, comprising:

a vertically pivotable lever (1);

a switch board (9) on which a fixed contact plate (14) is mounted; and a leaf spring (10) adapted to be moved into contact with the fixed contact plate (14) as said lever is vertically pivoted;

said leaf spring (10) having, at a first end, movable contacts (10b, 10c) adapted to be contacted with said fixed contact plate (14) and, at a second end, an attachment portion (10d) through which said leaf spring (10) is secured to said switch board (9);

wherein said leaf spring (10) has at least three tongues (10e) at said first end, said tongues including a central tongue (10e) having an operating portion (10a) placed in contact with said lever (1), and the other two tongues (10e) including said movable contacts (10b, 10c).

* * * * *